April 9, 1946. H. F. SCHMIDT 2,398,048
FLUID TREATMENT AND APPARATUS THEREFOR
Filed Feb. 14, 1942 2 Sheets-Sheet 1
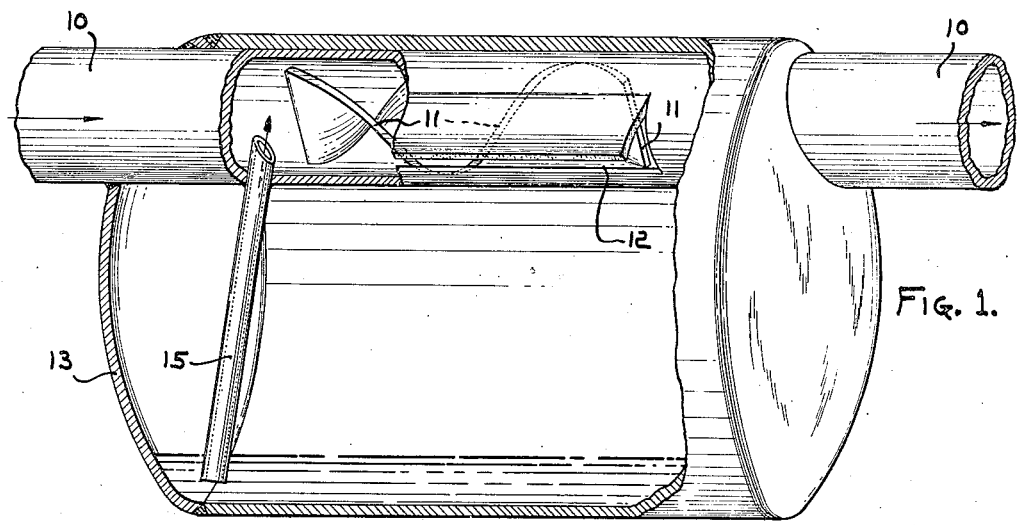
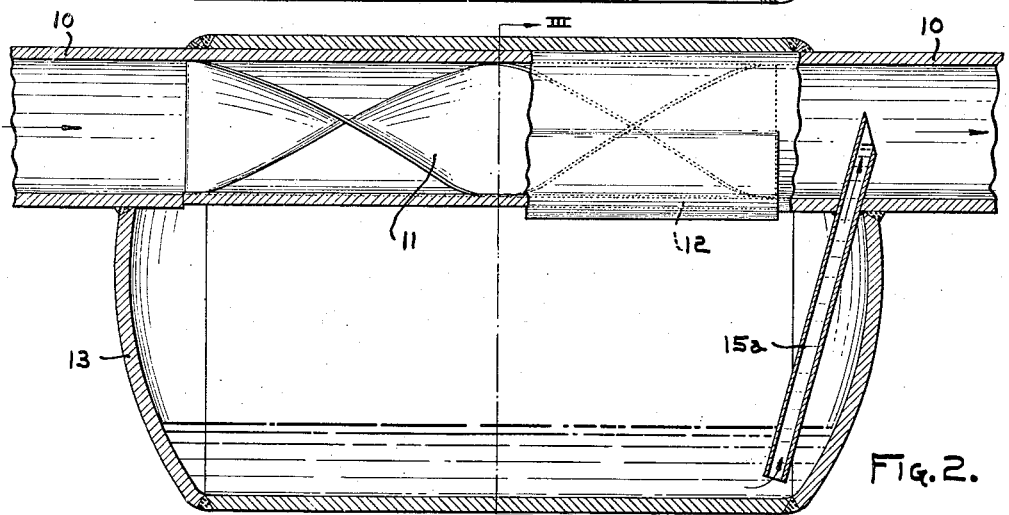
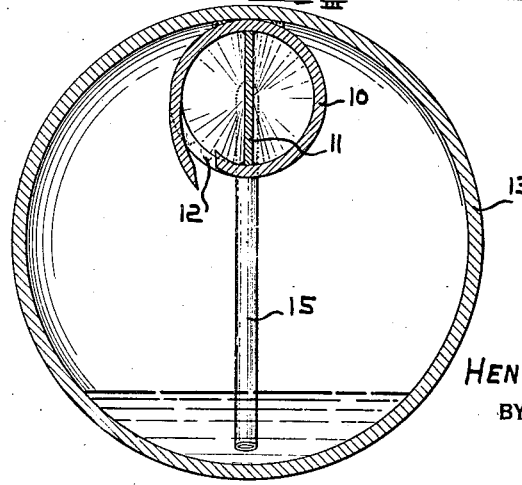
INVENTOR
HENRY F. SCHMIDT.
BY
ATTORNEY April 9, 1946.  H. F. SCHMIDT  2,398,048
FLUID TREATMENT AND APPARATUS THEREFOR
Filed Feb. 14, 1942   2 Sheets-Sheet 2
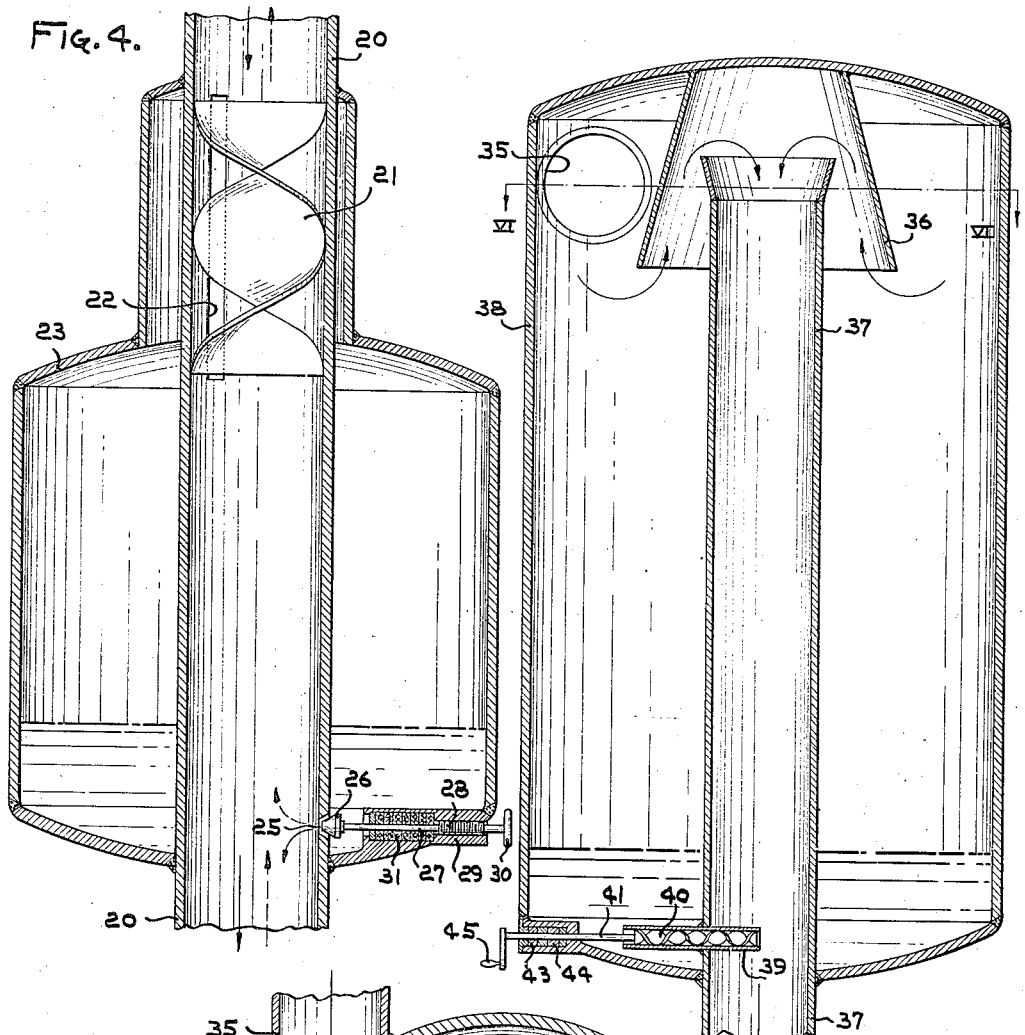
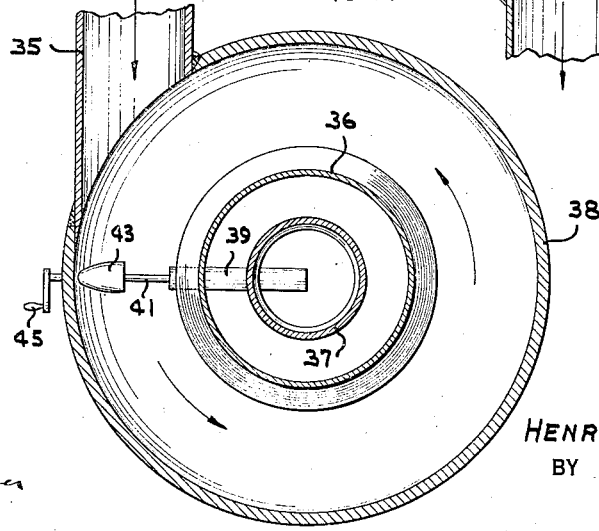
WITNESSES:
INVENTOR
HENRY F. SCHMIDT.
BY
ATTORNEY

UNITED STATES PATENT OFFICE 2,398,048

FLUID TREATMENT AND APPARATUS THEREFOR

Henry F. Schmidt, Lansdowne, Pa., assignor to Westinghouse Electric Corporation, East Pittsburgh, Pa., a corporation of Pennsylvania Application February 14, 1942, Serial No. 430,959

1 Claim. (Cl. 261—2)

This invention relates to the treatment of fluid containing slugs or large particles of liquid, more particularly to reducing the size of such slugs or large particles and has for an object the provision of novel apparatus for this purpose.

In steam power plant practice and operation, it frequently occurs that slugs or large particles of water are carried through the system by the steam from the boilers. Where the steam is supplied to a turbine, the passage of such slugs of water to the turbine and into contact with the blading thereof may frequently result in serious injury to the latter. Furthermore, even though traps are provided to remove such slugs from the steam prior to its passage through the turbine, it is necessary to provide some type of drainage system for disposing of the separated water. In large power plants or even in smaller plants, for example, on board ship, such a drainage system may become rather complicated. Therefore, another object of the invention is to provide the combination, with a conduit for flow of fluid and having a liquid separator, of means for returning the separated liquid to the fluid flowing through the conduit.

A further object of the invention is to provide, for use with a steam separator, apparatus for returning trapped water to the steam in relatively small particles.

Yet another object of the invention is to provide a novel method of treating a flowing stream of fluid containing slugs of liquid.

Another object of the invention is to provide a separator for removing the slugs of liquid from a stream of fluid together with an atomizer for returning the separated liquid to the stream of fluid in finely divided particles.

A further object of the invention is to remove, from a stream of fluid, liquid present therein in harmful quantities and to return such liquid to the stream of fluid in harmless quantities.

These and other objects are effected by the invention as will be apparent from the following description and claim taken in accordance with the accompanying drawings, forming a part of this application, in which:

In the drawings,

Fig. 1 is an elevational view of one form of the invention with portions of the structure broken away for the sake of clearness;

Fig. 2 is a view similar to Fig. 1, but with the atomizer disposed at the opposite end of the apparatus;

Fig. 3 is a transverse sectional view taken along the line III—III of Fig. 2, looking in the direction of the arrows;

Fig. 4 is a vertical sectional view of a further modification of the invention;

Fig. 5 is a view similar to Fig. 4, showing yet another form of the invention; and, Fig. 6 is a horizontal sectional view taken along the line VI—VI of Fig. 5.

Referring to the drawings more in detail, there is shown at 10 in Fig. 1 a conduit for flow of steam or other fluid in the direction indicated by the arrows. Suitable separating means is provided within the conduit and as shown is in the form of a spiral strip of metal 11 adapted to impart swirling motion to the stream of fluid, with the result that any slugs or large particles of liquid carried thereby are thrown outwardly by centrifugal force and leave the conduit through the slot 12 provided in the side thereof.

A tank 13 is associated with the conduit 10 and its separating apparatus and provides a chamber adapted to receive the liquid discharged through the slot 12. An atomizing tube 15 is positioned with its lower end close to, but spaced from, the bottom of the tank 15 with its upper end extending through a wall of the conduit 10 and terminating within the latter, with the result that the atomizing action produced by the flow of fluid through the conduit 10 draws the liquid from the tank 13 upwardly through the tube 15 and discharges it in finely divided form into the stream of fluid.

The apparatus shown in Figs. 2 and 3 is substantially the same as that shown in Fig. 1 except that the tube 15a discharges the liquid into the conduit 10 at the discharge side of the separating apparatus 11—12 instead of at the inlet side thereof.

In Fig. 4, the invention is shown as applied to a vertically-disposed steam conduit 20 through which the steam may flow downwardly as indicated by the solid arrows or upwardly as indicated by the dot-dash arrows. In either case the operation is substantially the same, a whirling motion being imparted to the steam by the spiral member 21 disposed within the conduit 20, this whirling motion resulting in centrifugal discharge of heavy particles of liquid through the slot 22 in the side of the conduit 20. The discharged liquid collects in the chamber defined by the tank 23 which surrounds the conduit 20 and is fed back to the stream of fluid in the conduit through the opening 25 in the wall thereof near the bottom of the tank.

Suitable means may be desirable for controlling the rate of return of separated liquid to the fluid stream. To this end, there is provided the plug 26 carried by the inner end of the shaft 27, the latter being mounted at 28 in a stuffing box 29 and having at its outer or exposed end a hand wheel or other suitable manual adjusting member 30. Packing 31 is positioned within the stuffing box to prevent leakage of fluid along the shaft 27.

In the embodiment shown in Figs. 5 and 6, the fluid enters the separating apparatus tangentially through the conduit 35, the swirling and centrifugal action produced by this tangential entry resulting in separation of large particles of liquid from the fluid, the liquid collecting in the tank 38 and the fluid passing upwardly under the hood 36 and downwardly through the upper open end of the conduit 37.

The separated and collected liquid is discharged from the tank 38 to the conduit 37 by way of the tube 39 which extends through the wall of the conduit 37. In order to retard the rate of discharge of the liquid through the tube 39, there is positioned within the latter a spiral member 40. Preferably, the spiral member is rotatably mounted within the tube and is provided with a shaft 41 integral therewith, the shaft extending through the stuffing box 43 and its packing 44. The end of the shaft 41 which projects outside of the separating apparatus is provided with suitable means, such as the crank 45, for imparting occasional rotary motion to the spiral member 40 to prevent clogging of the tube 39.

Throughout this specification and the claim, the term "slug" means liquid particles of such size as to be harmful or undesirable.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claim.

What is claimed is:

For use with piping for supplying steam to a suitable utilizing device; means for protecting the device against the entry of slugs of water with steam and comprising a receptacle to the interior of which is exposed a portion of suitable length of the pipe the major portion of said receptacle being lower than said portion of pipe; a slot formed in said pipe portion, extending lengthwise of the pipe, and providing for communication of the interior of the pipe with the interior of the receptacle; means for imparting to fluid traversing the pipe swirling motion as it passes over the slot to facilitate separation of the liquid constituent of the fluid and the passage of such constituent through the slot into the receptacle; an entrainment tube having one end arranged for submergence in liquid in the receptacle and having its other end opening into the pipe at a higher level than said one end so that the velocity of steam passing thereover is effective gradually to raise and entrain water from the receptacle and to secure admixture of such entrained water with the steam flowing through the pipe.

HENRY F. SCHMIDT.